United States Patent [19]

DeBusk

[11] Patent Number: 5,733,453

[45] Date of Patent: Mar. 31, 1998

[54] WASTEWATER TREATMENT SYSTEM AND METHOD

[75] Inventor: Thomas A. DeBusk, Cocoa, Fla.

[73] Assignee: Azurea, Inc., Orlando, Fla.

[21] Appl. No.: 680,432

[22] Filed: Jul. 15, 1996

[51] Int. Cl.[6] .................................................. C02F 3/32
[52] U.S. Cl. ........................... 210/602; 210/150; 210/170
[58] Field of Search ........................ 210/602, 615–618, 210/747, 150, 151, 170

[56] References Cited

U.S. PATENT DOCUMENTS

| | | | |
|---|---|---|---|
| 4,415,450 | 11/1983 | Wolverton | 210/602 |
| 4,904,386 | 2/1990 | Kickuth | 210/602 |
| 5,273,653 | 12/1993 | Kickuth | 210/602 |
| 5,486,291 | 1/1996 | Todd et al. | 210/602 |

*Primary Examiner*—Thomas G. Wyse
*Attorney, Agent, or Firm*—Allen, Dyer, Doppelt, Milbrath & Gilchrist

[57] ABSTRACT

An improved wastewater treatment system requires less land usage and achieves greater control of the modular treatment processes embodied therein. A vertically stacked system contains at least two different treatment process zones, one atop the other and separated by a water-impermeable barrier, which reduces land area requirements. Water to be treated is directed from one treatment process to the other sequentially and exits the system in a purified condition.

17 Claims, 2 Drawing Sheets

WASTEWATER TREATMENT SYSTEM AND METHOD

BACKGROUND OF THE INVENTION

1. Field of the Invention

The present invention relates to systems for treating waters and wastewaters, and, more particularly, to systems for the bioremediation of waters and wastewaters.

2. Description of Related Art

Water and wastewater treatment via "natural" means, i.e., without the addition of chemicals, has been accomplished with the use of aquatic plants that, in concert with the attendant microorganisms associated with the plants' roots and stems, absorb and biodegrade organic materials and excess nutrients. These aquatic plants have typically been located in artificial marshlands, also known as constructed wetlands, which are designed for gravity flow. Wetland treatment systems are being implemented on scales ranging from single-family dwellings ("on-site" systems) to medium-size cities. A negative aspect of such systems is that they are very land-intensive, requiring roughly on the order of 10–100 times as much land area as a conventional treatment plant, or, in terms of capacity, 5–40 acres per $10^6$ gallons of wastewater treated per day.

It is also known to add or sequence sand or gravel filters with wetlands. Such filters can follow the wetland, precede the wetland, or even be incorporated within the wetland. For example, rock filters situated at the headworks have been used to nitrify water recirculated from the effluent region of the treatment wetland. Treatment can also be enhanced by improving wastewater distribution. Two known methods are to disperse the entering wastewater both across ("plug flow") and along ("step feed") the system and also to recirculate the effluent for additional treatment.

Several varieties of aquatic macrophytes are known to be used in wetland systems, including cattails, bulrushes, and water hyacinths. These plants may be packed in unlined or lined trenches or basins filled with a granular porous medium such as gravel or crushed stone. It has also been suggested to use recycled, shredded scrap tires in the place of the gravel. Another suggested variant is to place a semipermeable barrier between a lower level into which effluent enters and the plant root system for directing the wastewater flow across the entire plant bed.

SUMMARY OF THE INVENTION

It is an object of the present invention to provide a water and wastewater treatment system and method that are less land intensive than previous systems.

It is another object to provide such a system and method that combine the advantages of a plurality of remediation techniques.

It is an additional object to provide such a system and method that can treat effluents having a variety of contaminants.

It is yet another object to provide such a system and method that include a modular approach.

These and other objects are achieved by the wastewater treatment system and method of the present invention, which is amenable to the treatment of, for example, contaminated surface water, contaminated ground water, domestic wastewater, industrial waste or process water, acid mine drainage, urban runoff, contaminated estuarine or near-shore ocean water, agricultural wastewaters or runoff, and even sludges. The types of contaminants that can be treated in the system include suspended particles, nutrients, metals, simple organics (oxygen-demanding substances), and synthetic or complex organics.

The invention addresses a vertically stacked water treatment system that also comprises a water-impervious treatment bed. Adjacent a bottom of the treatment bed is positioned a first treatment means for purifying wastewater. In use incoming wastewater is directed into the first end of the first treatment means, from which the water flows through the first treatment means to the second, opposite end, being treated along the flow path. The partially treated water is then pumped upward to a second, different treatment means, positioned atop the first treatment means, and the water then flows from a second end to a first end of the second treatment means.

The first and the second water treatment means are separated by a water-impermeable barrier positioned atop the first treatment means, which prevents water being treated from commingling. System effluent is then directed from the first end of the second treatment means to an exterior of the treatment bed. This vertical stacking is thus seen to permit at least two unit processes to be utilized to treat wastewater while not increasing the required land area.

In an alternate subembodiment, incoming wastewater is first directed into the second end of the second treatment means, from which it flows through the second treatment means to the first, opposite end, being treated along the flow path. The partially treated water is then directed to the first, different treatment means, positioned beneath the second treatment means, and the water then flows from the first end to the second end of the first treatment means. Typically, then, pumping means remove effluent from the lower treatment means.

It is to be understood that the connotation of "end" is to be taken broadly, that is, the system is intended to embrace both generally vertical and generally horizontal flows.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
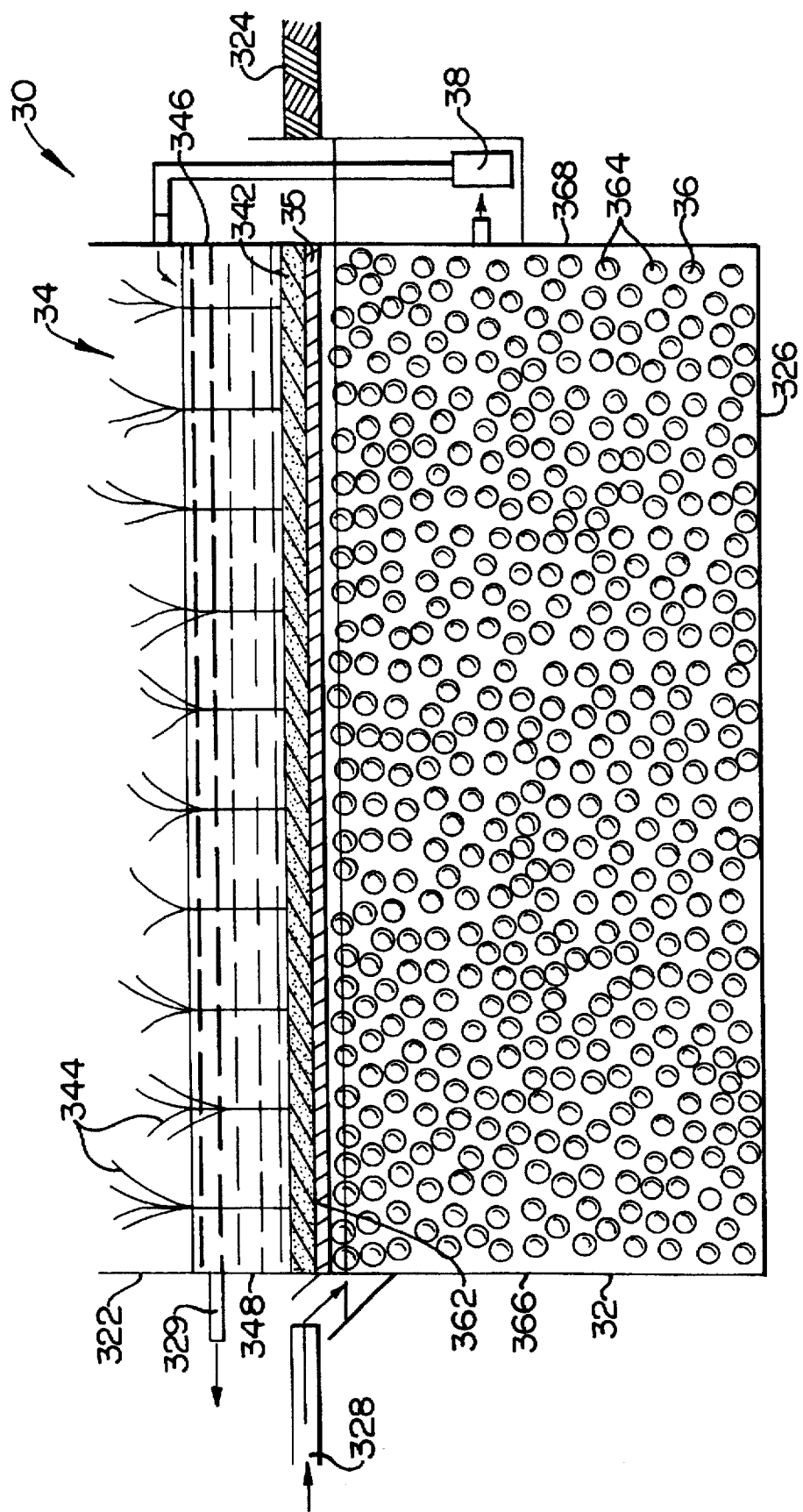
FIG. 1 is a cross-sectional view of a vertically stacked water treatment system, operating from bottom to top, including a wetland as an upper treatment means.
Figure 2:
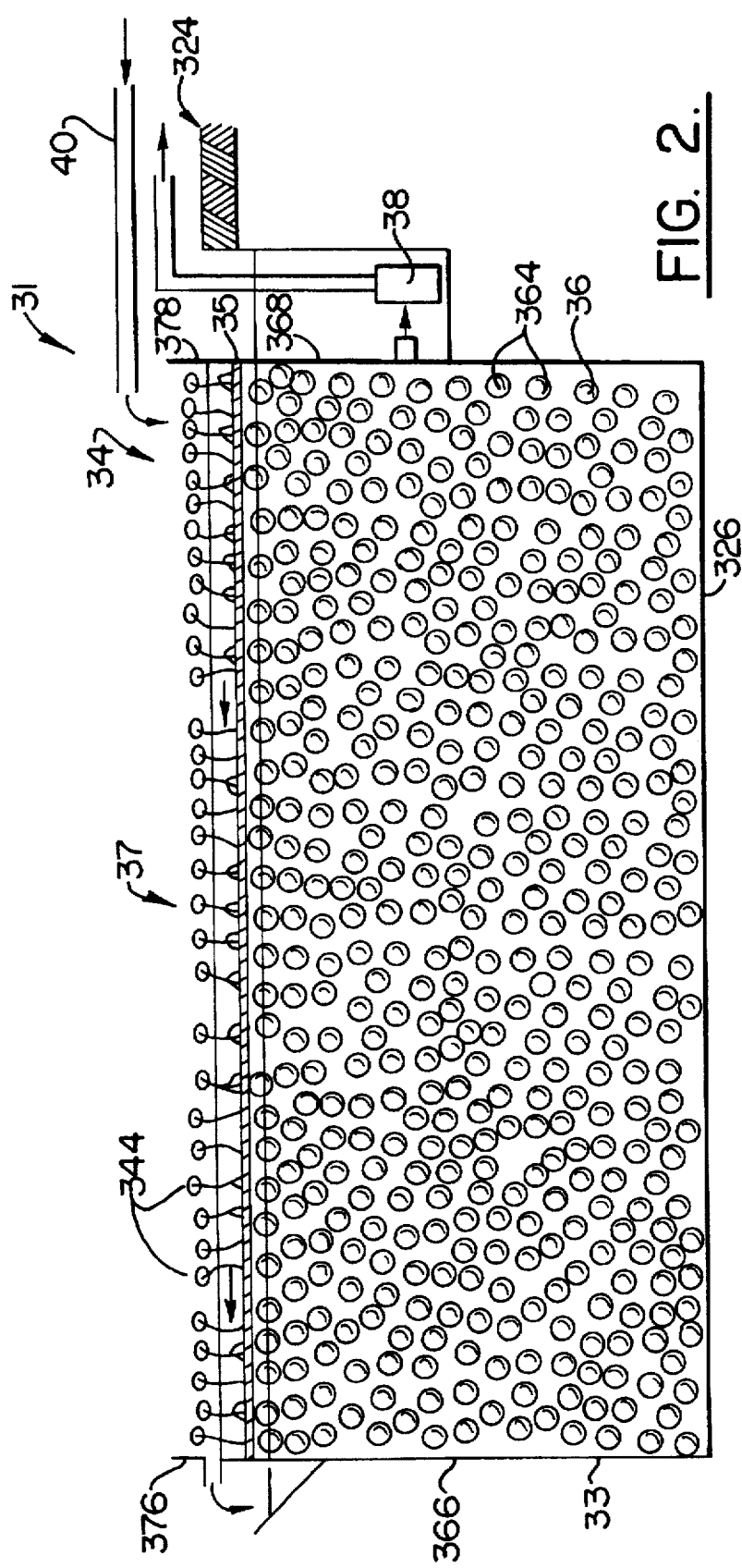
FIG. 2 is a cross-sectional view of another embodiment of the vertically stacked water treatment system, operating from top to bottom, including a periphyton filter or rhizosphere system as an upper treatment means.

A description of the preferred embodiments of the present invention will now be presented with reference to FIGS. 1 and 2.

The vertically stacked water treatment system and method of the present invention are illustrated in FIGS. 1 and 2. This water treatment system comprises a water-impervious treatment bed 32 that includes a means for treating wastewater, generally surrounded by walls or berms 322 and typically extending below ground level 324.

In a preferred embodiment, a first treatment means for purifying wastewater is positioned generally adjacent the bottom 326 of the treatment bed 32. This first treatment means here comprises a porous matrix filter 36 that comprises a bed of pieces of matrix material that has a generally horizontal top surface 362. These pieces of matrix material, which are shown in FIGS. 1 and 2 as comprising rocks 364, may also comprise other materials such as gravel, shredded recycled tires, plastic media, or wood chips.

Attached to the rocks 364 is a colony of microbes (not shown) having characteristics for attaching to the rocks 364 and for immobilizing and transforming the wastewater contaminants.

In a first embodiment of the water treatment system 30, shown in FIG. 1, incoming wastewater is directed into the first end 366 of the matrix filter 36 typically by piping 328 combined with gravity feed, since the matrix filter 36 is typically below ground level 324. The water then flows downward and horizontally, being treated along the flow path, and finally emerging at the second end 368 of the matrix filter 36. From here a sump pump 38 pumps the partially treated wastewater upward to above ground level 324, where it is deposited into a second treatment means.

This second treatment means in a preferred embodiment comprises, for example, a wetland 34. Such a wetland 34 comprises a layer of soil 342 and a generally planar array of plants 344 growable under conditions of at least partial submersion, and may include such varieties as cattail, bulrush, or giant reed. A colony of microbes (not shown) having characteristics for attaching to the plants and to the soil serve to immobilize and transform the wastewater contaminants. The microbes serve the function of immobilizing and transforming the wastewater contaminants. The removal of these contaminants is also performed by other physical and chemical surface phenomena, such as sedimentation, adsorption, and precipitation.

The wetland 34 has a first end 346, into which the pumped water is deposited from the matrix filter 36, and a second end 348 that is generally opposite the first end 346, from which the treated water is directed via piping 329 to an exterior of the treatment bed 32.

A water-impermeable barrier 35 is positioned atop the matrix filter 36 to prevent commingling of water being treated between the matrix filter 36 and the wetland 34. The barrier itself can be porous to gases, or it can be equipped with vents to release gases produced by microbial activity in the matrix filter. The system 30 is therefore modular, but requires only roughly half the land area needed by previously used processes.

In a second embodiment of the wastewater treatment system 31, shown in FIG. 2, incoming wastewater is directed into the second treatment means of the treatment bed 34. Here the second treatment means comprises, for example, a periphyton filter or a rhizosphere (very shallow macrophyte) system 37. The water is deposited, for example, via piping 40, into the second end 378, from which it flows toward the first end 376. From here the treated water is directed to the first end 366 of the matrix filter 36 typically by gravity feed, since the matrix filter 36 is typically below ground level 324. The water then flows downward and horizontally, being treated along the flow path, and finally emerging at the second end 368 of the matrix filter 36. From here a sump pump 38 pumps the treated wastewater upward to above ground level to an exterior of the treatment bed 34.

A water-impermeable barrier 35 is positioned atop the matrix filter 36 to prevent commingling of water being treated between the matrix filter 36 and the rhizosphere system 37. The system 31 is therefore modular, but requires only roughly half the land area needed by previously used processes.

It may be appreciated by one skilled in the art that additional embodiments may be contemplated, including combinations of horizontal and vertical flows. The upper treatment means may include shallow surface-flow or subsurface-flow wetlands, rhizosphere systems, periphyton filters, or nonvegetated shallow rock or matrix filters. The lower treatment means may include rock or matrix filters (gravel, limerock, plastic, shredded tires) with chemical or biological "surface area" processes being the dominant contaminant removal mechanisms. The lower treatment means may also function as a storage reservoir or heat sink, prior to waste discharge or recycling to the upper treatment means.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed:

1. A vertically stacked water treatment system comprising:

a water-impervious treatment bed;

a first treatment means for purifying wastewater positioned generally adjacent a bottom of the treatment bed, the first treatment means having a first end and a second end generally opposite the first end;

means for directing incoming wastewater into the first end of the first treatment means;

a water-impermeable barrier positioned atop the first treatment means;

a second treatment means for purifying wastewater different from the first treatment means, the second treatment means positioned atop the barrier and having a first end and a second end generally opposite the first end;

means for directing water from the second end of the first treatment means to the second end of the second treatment means; and means for directing water from the first end of the second treatment means to an exterior of the treatment bed.

2. The water treatment system recited in claim 1, wherein the second treatment means comprises a wetland comprising:

a layer of soil;

a generally planar array of plants growable under conditions of at least partial submersion; and a colony of microbes having characteristics for attaching to the plants and to the soil, and for immobilizing and transforming the wastewater contaminants.

3. The water treatment system recited in claim 2, wherein the first treatment means comprises a porous matrix filter comprising:

a bed of pieces of matrix material having a generally horizontal top surface; and a colony of microbes having characteristics for attaching to the matrix material and for immobilizing and transforming the wastewater contaminants.

4. The water treatment system recited in claim 3, wherein the pieces of matrix material comprises pieces of matrix material selected from the group consisting of rocks, gravel, and shredded recycled tires.

5. The water treatment system recited in claim 3, wherein the means for directing water from the matrix filter to the wetland comprises a pump.

6. The water treatment system recited in claim 1, wherein the second treatment means comprises a periphyton filter.

7. The water treatment system recited in claim 1, wherein the second treatment means comprises a rhizosphere system.

8. A vertically stacked water treatment system comprising:

a water-impervious treatment bed;

a first treatment means for purifying wastewater positioned generally adjacent a bottom of the treatment bed, the first treatment means having a first end and a second end generally opposite the first end;

a second treatment means for purifying wastewater different from the first treatment means, positioned generally adjacent a top of the treatment bed, the second treatment means having a first end and a second end generally opposite the first end;

a water-impermeable barrier positioned atop the first treatment means and beneath the second treatment means;

means for directing incoming wastewater into the second end of the second treatment means;

means for directing water from the first end of the second treatment means to the first end of the first treatment means; and means for directing water from the second end of the first treatment means to an exterior of the treatment bed.

9. The water treatment system recited in claim 8, wherein the second treatment means comprises a wetland comprising:

a layer of soil;

a generally planar array of plants growable under conditions of at least partial submersion; and a colony of microbes having characteristics for attaching to the plants and to the soil, and for immobilizing and transforming the wastewater contaminants.

10. The water treatment system recited in claim 9, wherein the first treatment means comprises a porous matrix filter comprising:

a bed of pieces of matrix material having a generally horizontal top surface; and a colony of microbes having characteristics for attaching to the matrix material and for immobilizing and transforming the wastewater contaminants.

11. The water treatment system recited in claim 10, wherein the pieces of matrix material comprises pieces of matrix material selected from the group consisting of rocks, gravel, and shredded recycled tires.

12. The water treatment system recited in claim 10, wherein the means for directing water from the wetland to the matrix filter comprises gravity feed.

13. The water treatment system recited in claim 10, wherein the means for directing water from the matrix filter to treatment bed exterior comprises a pump.

14. The water treatment system recited in claim 8, wherein the second treatment means comprises a periphyton filter.

15. The water treatment system recited in claim 8, wherein the second treatment means comprises a rhizosphere system.

16. A method for treating wastewater comprising the steps of:

providing a water-impervious treatment bed;

delivering wastewater to the bed;

purifying wastewater using a first treatment means adjacent a bottom of the treatment bed by permitting the wastewater the flow through the first treatment means from a first end to a second end;

providing a water-impermeable barrier positioned atop the first treatment means;

directing water from the second end of the first treatment means to a second treatment means different from the first treatment means and positioned atop the first treatment means;

purifying water using the second treatment means by permitting the water to flow from a second end to a first end without intermingling with the water being purified by the first treatment means; and directing water from the first end of the second treatment means to an exterior of the treatment bed.

17. A method for treating wastewater comprising the steps of:

providing a water-impervious treatment bed;

delivering wastewater to the bed;

purifying wastewater using a second treatment means adjacent a top of the treatment bed by permitting the wastewater the flow through the second treatment means from a second end to a first end;

providing a water-impermeable barrier positioned beneath the second treatment means;

directing water from the first end of the first treatment means to a first treatment means different from the second treatment means and positioned beneath the second treatment means;

purifying water using the first treatment means by permitting the water to flow from a first end to a second end without intermingling with the water being purified by the second treatment means; and directing water from the first end of the first treatment means to an exterior of the treatment bed.

* * * * *